US011057203B2

(12) United States Patent
Paczkowski et al.

(10) Patent No.: US 11,057,203 B2
(45) Date of Patent: *Jul. 6, 2021

(54) NETWORK FUNCTION VIRTUALIZATION (NFV) HARDWARE TRUSTED HOSTED MANO

(71) Applicant: T-MOBILE INNOVATIONS LLC, Overland Park, KS (US)

(72) Inventors: Lyle Walter Paczkowski, Mission Hills, KS (US); Arun Rajagopal, Leawood, KS (US); Marouane Balmakhtar, Dumfries, VA (US)

(73) Assignee: T-MOBILE INNOVATIONS LLC, Overland Park, KS (US)

(*) Notice: Subject to any disclaimer, the term of this patent is extended or adjusted under 35 U.S.C. 154(b) by 0 days.

This patent is subject to a terminal disclaimer.

(21) Appl. No.: 16/514,656

(22) Filed: Jul. 17, 2019

(65) Prior Publication Data
US 2019/0342089 A1 Nov. 7, 2019

Related U.S. Application Data

(63) Continuation of application No. 15/394,507, filed on Dec. 29, 2016, now Pat. No. 10,404,456.

(51) Int. Cl.
H04L 29/06 (2006.01)
H04L 9/08 (2006.01)
(Continued)

(52) U.S. Cl.
CPC .......... H04L 9/0861 (2013.01); H04L 9/3236 (2013.01); H04L 9/3263 (2013.01); H04L 41/042 (2013.01); H04L 63/0823 (2013.01)

(58) Field of Classification Search
CPC ... H04L 9/0861; H04L 9/3236; H04L 9/3263; H04L 41/042; H04L 63/0823
(Continued)

(56) References Cited

U.S. PATENT DOCUMENTS 8,971,538 B1 3/2015 Marr et al.
9,386,001 B1 7/2016 Marquardt et al.
(Continued)

FOREIGN PATENT DOCUMENTS

WO 2015062627 A1 5/2015
WO 2016081867 A1 5/2016
(Continued)

OTHER PUBLICATIONS

Bo Han; Network Function Virtualization: Challenges and Opportunities for Innovations; IEEE:2019; p. 90-97.*
(Continued)

Primary Examiner — Monjur Rahim

(57) ABSTRACT

A Network Function Virtualization (NFV) system implements hardware trusted Management and Orchestration (MANO). A Hardware (HW) trust server issues a HW trust challenge to a first MANO system. The first MANO system hashes its physically-embedded read-only hardware trust key to generate a HW trust result and transfers the HW trust result to the HW trust server. The HW trust server validates the hardware trust result and transfers a HW trust certificate to the first MANO system. The first MANO system transfers the HW trust certificate and NFV MANO data to a second MANO system. The second MANO system validates the HW trust certificate. The second MANO system exchanges NFVI control data with NFVI circuitry responsive to the NFV MANO data when the HW trust certificate is valid. The second MANO system isolates the NFV MANO data when the HW trust certificate is not valid.

20 Claims, 7 Drawing Sheets

(51) Int. Cl.
*H04L 9/32* (2006.01)
*H04L 12/24* (2006.01)

(58) Field of Classification Search
USPC .......................................................... 713/156
See application file for complete search history.

(56) References Cited

U.S. PATENT DOCUMENTS

| | | | | |
|---|---|---|---|---|
| 2012/0266252 | A1* | 10/2012 | Spiers ................... | H04L 9/3247 726/26 |
| 2014/0229945 | A1* | 8/2014 | Barkai ................ | G06F 9/45533 718/1 |
| 2015/0358161 | A1* | 12/2015 | Kancharla ............. | G06F 21/602 713/164 |
| 2016/0182567 | A1* | 6/2016 | Sood ................... | H04L 63/1441 726/1 |
| 2016/0219076 | A1 | 7/2016 | Paczkowski et al. | |
| 2016/0226913 | A1* | 8/2016 | Sood ........................ | H04Q 9/00 |
| 2017/0177873 | A1* | 6/2017 | Raghuram ............ | G06F 21/575 |
| 2017/0364685 | A1* | 12/2017 | Shah ....................... | G06F 21/53 |
| 2018/0004954 | A1* | 1/2018 | Liguori ................. | G06F 21/575 |
| 2018/0114012 | A1* | 4/2018 | Sood ....................... | G06F 21/53 |

FOREIGN PATENT DOCUMENTS

| | | |
|---|---|---|
| WO | 2016096005 A1 | 6/2016 |
| WO | 2016182656 A1 | 11/2016 |

OTHER PUBLICATIONS

Dr. Jim Metzler; "The 2015 Guide to SDN and NFV;" 2015; pp. 1-90; Webtorials.

ETSI; "Network Functions Virtualisation (NFV); Management and Orchestration;" Group Specification; Dec. 2014; pp. 1-184; ETSI GS NFV-MAN 001 V1.1.1; ETSI; Sophia Antipolis Cedex, France.

ETSI; "Network Functions Virtualisation (NFV); Security Report; Security Management and Monitoring for NFV [Release 2];" Group Specification; Oct. 2016; pp. 1-53; Draft ETSI GS NFV-SEC 013 V0.0.5; ETSI; Sophia Antipolis Cedex, France.

Ben Pfaff, et al.; "Extending Networking into the Virtualization Layer;" Opnswitch.org; 2009; pp. 1-6.

* cited by examiner

NETWORK FUNCTION VIRTUALIZATION (NFV) HARDWARE TRUSTED HOSTED MANO

RELATED CASES

This United States Patent Application is a continuation of U.S. patent application Ser. No. 15/394,507 that was filed on Dec. 29, 2016 and is entitled "NETWORK FUNCTION VIRTUALIZATION (NFV) HARDWARE TRUSTED HOSTED MANO." U.S. patent application Ser. No. 15/394,507 is hereby incorporated by reference into this United States Patent Application.

TECHNICAL BACKGROUND

Data communication systems exchange user data for user devices to provide various data communication services. The user devices may be phones, computers, media players, and the like. The data communication services might trust be media streaming, audio/video conferencing, data messaging, or internet access. Network Function Virtualization (NFV) computer systems are used to host data communication systems and deliver their data communication services.

NFV computer systems have Virtual Network Functions (VNFs) that perform data networking tasks. The NFV computer systems execute the VNFs under the control of a virtual software layer. The VNFs communicate with one another over the virtual layer. The VNFs also communicate with external systems over the virtual layer. To implement a data communication service, an NFV Management and Orchestration (MANO) system directs the virtual layer software to drive the execution of VNFs based on various descriptors for the data communication service.

In a Software Defined Network (SDN), the VNFs may be SDN applications, SDN controllers, and virtual SDN data machines. The executing VNFs drive the delivery of the data communication services. The MANO system may scale the data communication system by adding and removing VNFs. The MANO system may scale the VNFs by adding and removing their computer hardware resources and virtual layer components like virtual switching.

Hardware trust entails the software verification of the identity of the physical hardware that is executing the software and handling the user data. Some computer hardware has physically-embedded hardware trust keys. Hardware trust software drives circuitry to read and hash these physical keys to prove hardware identity. A hardware trust server that stores a copy of the hardware trust keys validates the hardware identities by performing the same hashes and comparing the hash results. Unfortunately, hardware trust is not effectively deployed in NFV infrastructures and MANO systems. In particular, NFV Infrastructures (NFVIs) do not have efficient and effective access to hardware trusted MANO systems that are hosted on different computer hardware.

TECHNICAL OVERVIEW

A Network Function Virtualization (NFV) system implements hardware trusted Management and Orchestration (MANO). A Hardware (HW) trust server issues a HW trust challenge to a first MANO system. The first MANO system hashes its physically-embedded read-only hardware trust key to generate a HW trust result and transfers the HW trust result to the HW trust server. The HW trust server validates the hardware trust result and transfers a HW trust certificate to the first MANO system. The first MANO system transfers the HW trust certificate and NFV MANO data to a second MANO system. The second MANO system validates the HW trust certificate. The second MANO system exchanges NFVI control data with NFVI circuitry responsive to the NFV MANO data when the HW trust certificate is valid. The second MANO system isolates the NFV MANO data when the HW trust certificate is not valid.

DETAILED DESCRIPTION

FIGS. 1-4 illustrate Network Function Virtualization (NFV) data communication system 100 to implement hardware trusted Management and Orchestration (MANO). NFV data communication system 100 exchanges user data for user devices like computers, phones, or some other intelligent machines. The data exchange supports data services such as content streaming, media conferencing, machine communications, internet access, or some other computerized information service.

Figure 1:
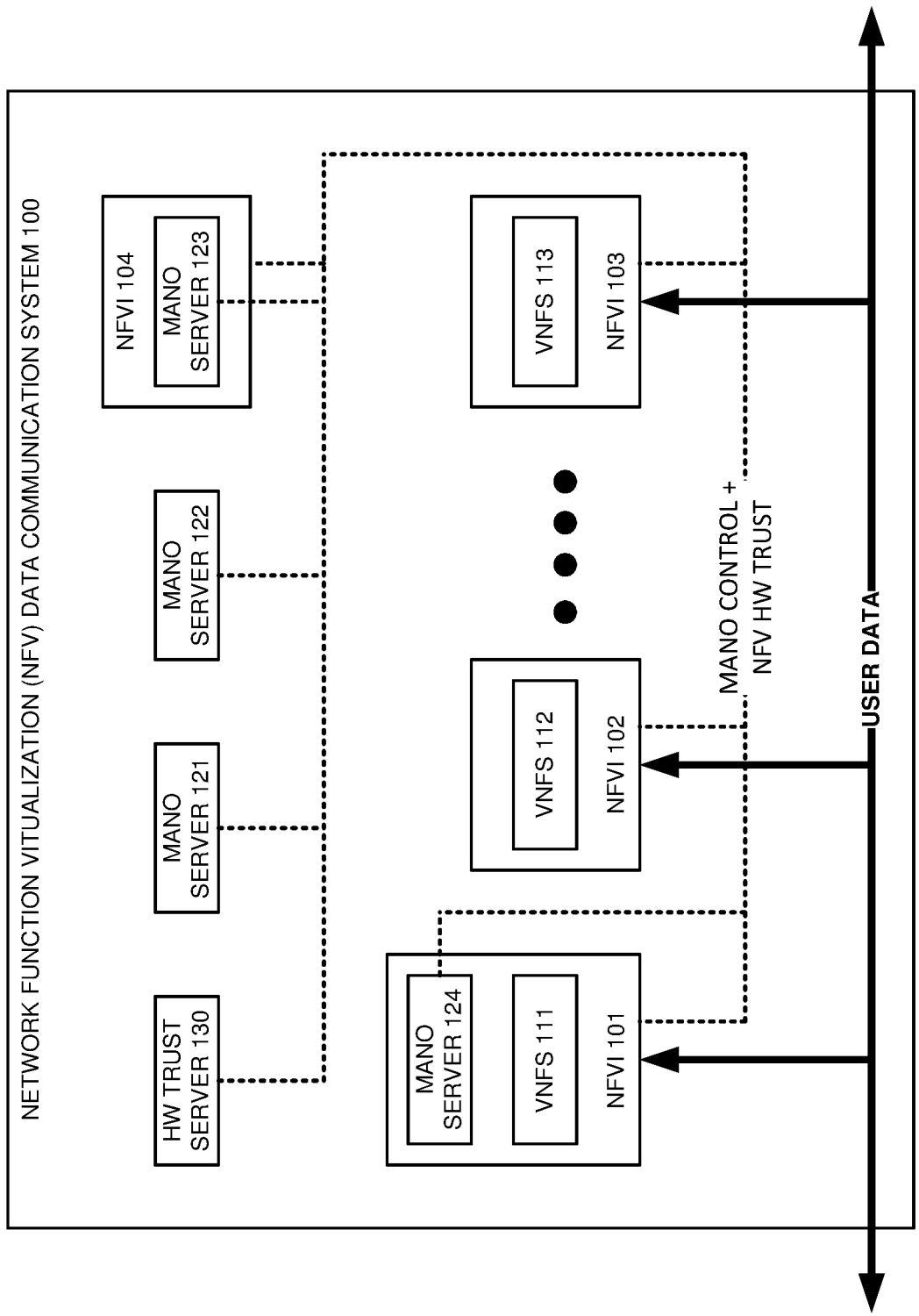
FIGS. 1-4 illustrate a Network Function Virtualization (NFV) data communication system to implement a hardware trusted Management and Orchestration (MANO) system.

NFV data communication system 100 is made of computer hardware like Central Processing Units (CPUs), Random Access Memory (RAM), persistent data storage, bus interfaces, and data transceivers. NFV data communication system 100 also has computer software like hypervisor, operating system, virtual machine, Virtual Network Function (VNF), Management and Orchestration (MANO), and hardware trust. Referring to FIG. 1, NFV data communication system 100 comprises NFV Infrastructures (NFVIs) 101-103, MANO servers 121-124, and Hardware (HW) trust server 130. The number of NFVIs is restricted for clarity.

NFVIs 101-103 execute VNFs 111-113 to exchange user data under VNF control. NFV data communication system 100 further includes MANO servers 121-124. MANO servers 121-124 exert management control over NFVIs 101-103 through the exchange of NFV MANO data. HW trust server 130 issues hardware trust challenges and verifies HW trust responses. HW trust server 130 distributes HW trust digital certificates to MANO servers 121-124 for validation by NFVIs 101-103 and/or VNFs 111-113. NFVIs 101-103 and MANO servers 121-124 each include a unique and secret physically-embedded hardware trust key. NFVIs 101-103 and MANO servers 121-124 read and process these physical hardware trust keys to perform hardware trust operations. HW trust server 130 stores a set of the hardware trust keys.

Figure 2:
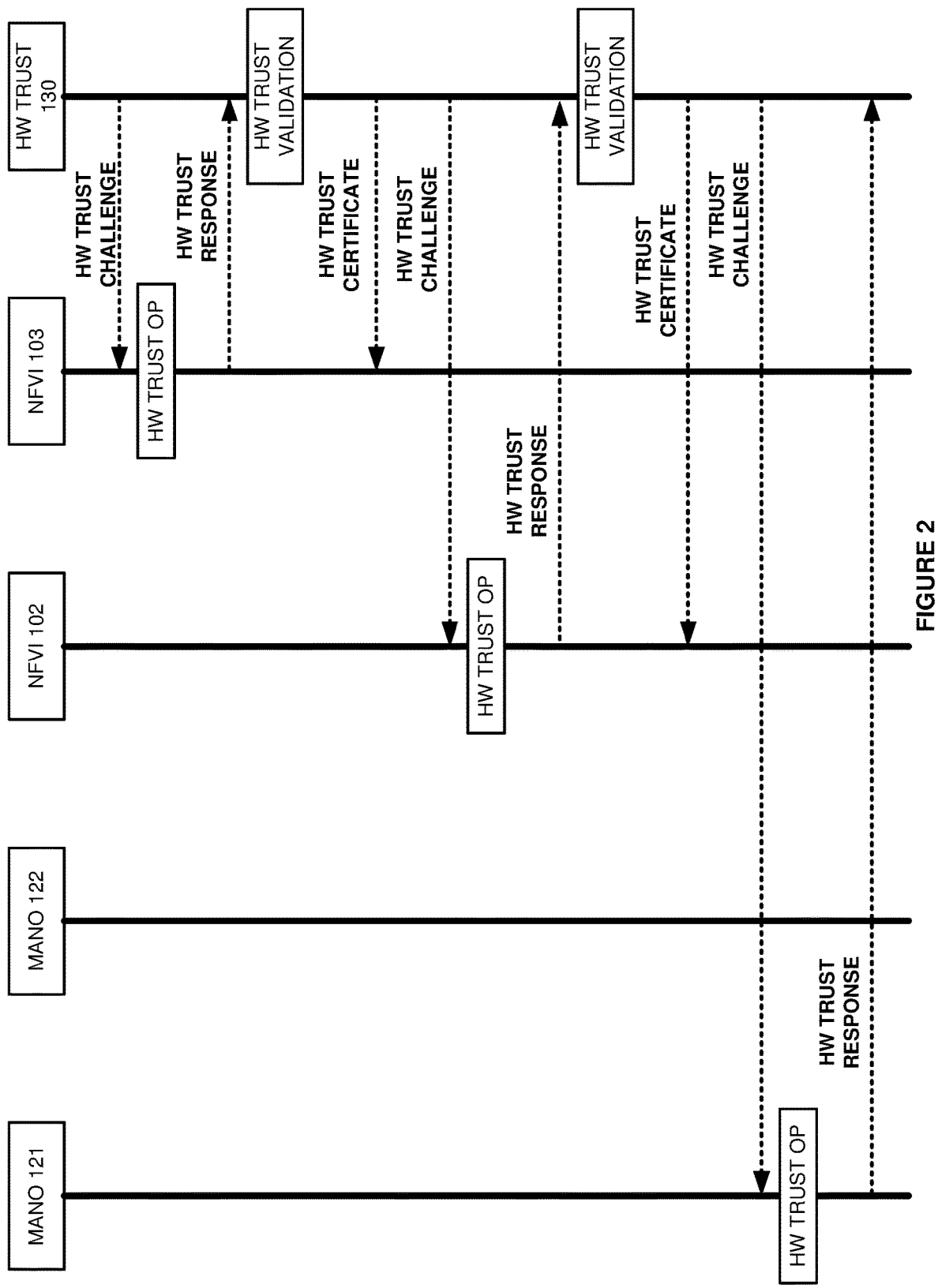
Figure 3:
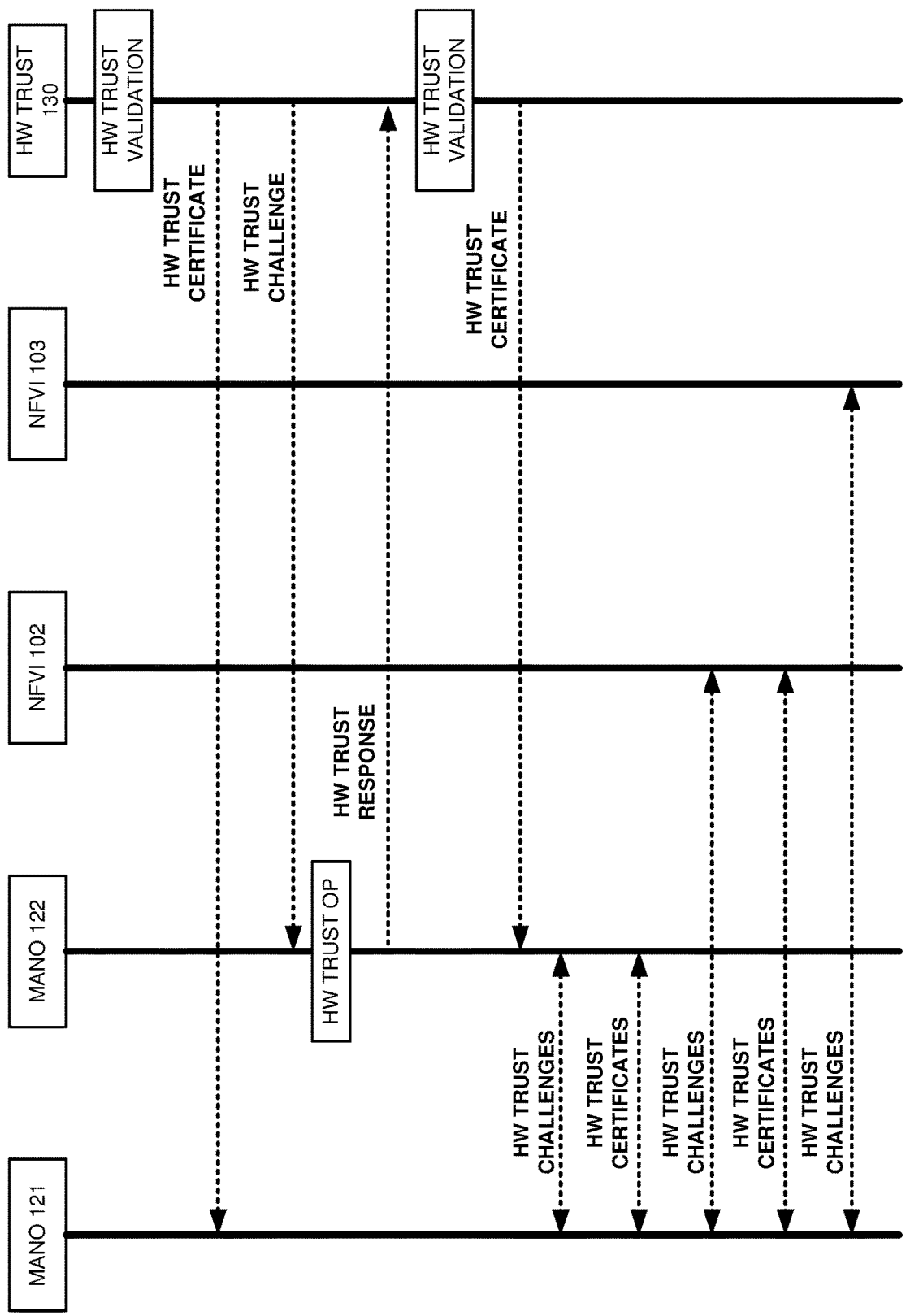
Figure 4:
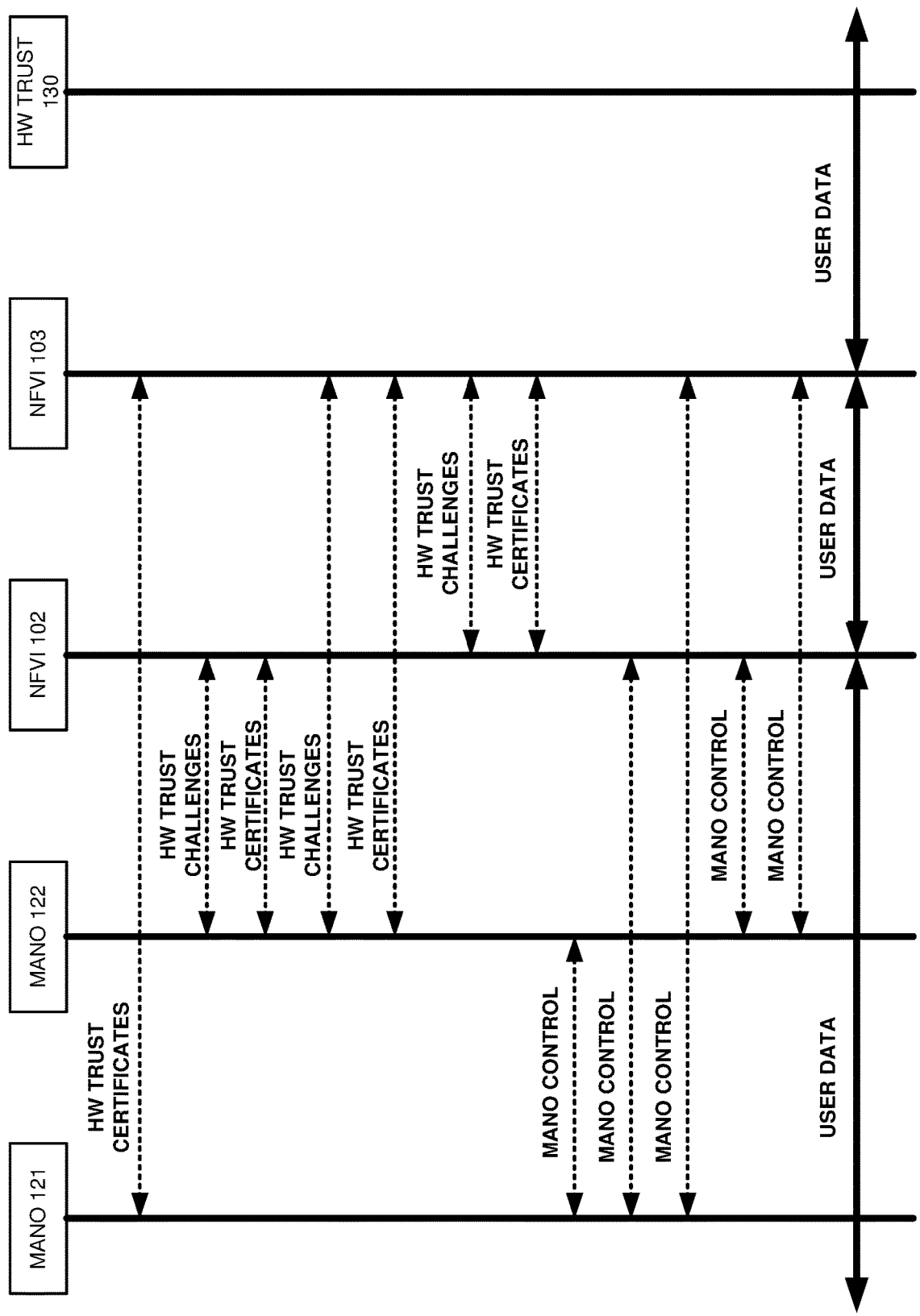

Referring to FIGS. 2-4, the operation of NFV data communication system 100 is described. On FIG. 2, HW trust server 130 issues a HW trust challenge to NFVI 103 indicating a random number. NFVI 103 performs a HW trust operation (OP) by hashing the random number with its physically-embedded hardware trust key to generate a HW trust result. NFVI 103 transfers the HW trust result to HW trust server 130. HW trust server 130 validates the hardware trust result by performing the same hash on the same random number and HW trust key to generate the same HW trust result. If the HW trust validation is positive, then HW trust server 130 transfers a HW trust certificate to NFVI 103. HW trust server 130 transfers a HW trust certificate to NFVI 103 in this example.

In a like manner, HW trust server 130 issues a HW trust challenge to NFVI 102 indicating a random number. NFVI 102 performs a HW trust operation by hashing the random number with its physically-embedded hardware trust key to generate a HW trust result. NFVI 102 transfers its HW trust result to HW trust server 130. HW trust server 130 validates the hardware trust result, and since the HW trust validation is positive, HW trust server 130 transfers a HW trust certificate to NFVI 102.

HW trust server 130 also issues a HW trust challenge to MANO server 121 indicating a random number. MANO server 121 performs the HW trust operation by hashing its random number and physically-embedded hardware trust key to generate the HW trust result. MANO server 121 transfers its HW trust result to HW trust server 130. Referring to FIG. 3, HW trust server 130 validates the hardware trust result, and since the HW trust validation is positive, HW trust server 130 transfers a HW trust certificate to MANO server 121.

Likewise, HW trust server 130 issues a HW trust challenge to MANO server 122 indicating a random number. MANO server 122 performs the HW trust operation by hashing its random number and physically-embedded hardware trust key to generate the HW trust result. MANO server 122 transfers its HW trust result to HW trust server 130. HW trust server 130 validates the hardware trust result, and since the HW trust validation is positive, HW trust server 130 transfers a HW trust certificate to MANO server 122.

MANO servers 121-122 exchange HW trust challenge data with one another and responsively exchange their HW trust certificates. NFVI 102 and MANO system 121 exchange HW trust challenge data with one another and responsively exchange their HW trust certificates. NFVI 103 and MANO system 121 exchange HW trust challenge data with one another, and referring to FIG. 4, NFVI 103 and MANO system 121 responsively exchange their HW trust certificates. NFVI 102 and MANO system 122 exchange HW trust challenge data with one another, and NFVI 103 and MANO system 121 responsively exchange their HW trust certificates. NFVI 103 and MANO system 122 exchange HW trust challenge data with one another, and NFVI 103 and MANO system 122 responsively exchange their HW trust certificates. NFVIs 102-103 exchange HW trust challenge data with one another and responsively exchange their HW trust certificates.

The above HW trust data transfers may occur over MANO interfaces like VNF-VNFM, VIM-hypervisor, and orchestration-orchestration. After the above HW trust data transfers, the HW trust certificates are verified by the receiving entity by using a key from HW trust server 130. Any hardware trust failures are reported to HW trust server 130 and operations are performed to isolate the untrusted system.

Once HW trust is established, MANO servers 121-122 exchange NFV MANO data with one another and with NFVIs 102-103. NFVIs 102-103 will isolate (and not implement) the NFV MANO data from a MANO server that does not have current HW trust. NFVIs 102-103 do not exchange user data with NFVIs that do not have current HW trust. MANO servers 121-122 do not provide NFV MANO data to NFVIs or other MANO servers that do not have current HW trust. Since HW trust is established in this example, the NFVIs exchange user data responsive to the MANO control.

Advantageously, MANO servers may be hosted separately from NFVIs but remain hardware trusted. NFV MANO server 123 is hosted by NFVI 104, and NFVI 104 is physically discrete from NFVI 102. NFVI 102 can refuse NFV MANO control from hosted MANO server 123 until MANO server 123 provides a valid hardware trust certificate. Thus, NFVIs can use various MANO servers in an on-demand fashion with the security of hardware trust. NFVIs can use the same technique to accept user data from only hardware trusted NFVIs. In a like manner, MANO servers can also be configured to only interact with hardware trusted MANO servers and NFVIs.

Figure 5:
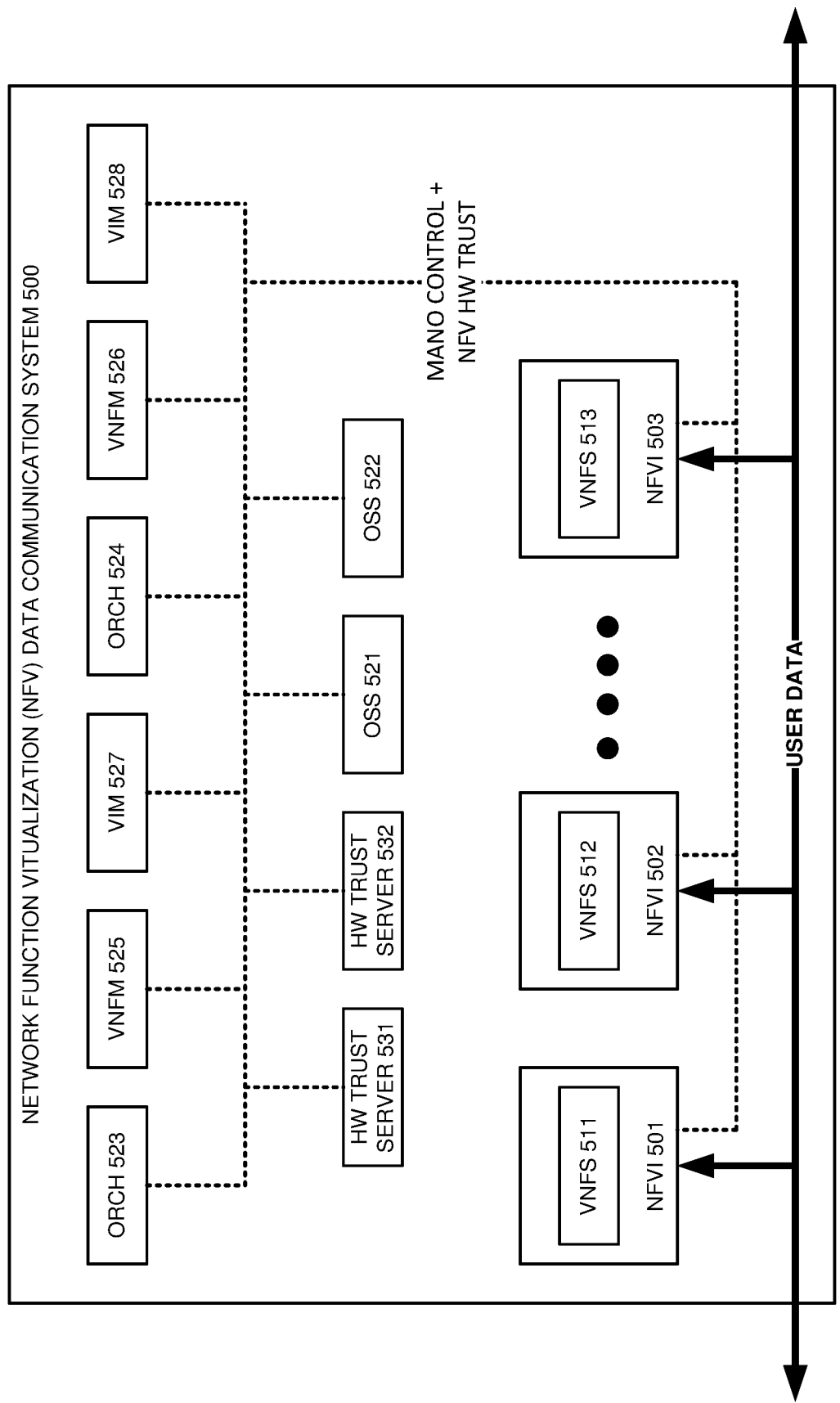
FIG. 5 illustrates an NFV data communication system to implement a hardware trusted and distributed MANO system.

FIG. 5 illustrates Network Function Virtualization (NFV) data communication system 500 to implement a hardware trusted and distributed Management and Orchestration (MANO). NFV system 500 is an example of NFV data communication system 100, although NFV system 100 may vary from this example. NFV data communication system 500 comprises NFV Infrastructures (NFVIs) 501-503 that execute Virtual Network Functions (VNFs) 511-513. VNFs 511-513 drive NFVIs 501-503 to exchange user data to support various user data services. The number of NFVIs is restricted for clarity.

NFV data communication system 500 also features a distributed MANO system that comprises: Operations Support Systems (OSS) 521-522, MANO orchestrators (ORCH) 523-524, VNF Managers (VNFMs) 525-526, Virtual Infrastructure Managers (VIMs) 527-528, and Hardware (HW) trust servers 531-532. Read-only HW trust keys are physically embedded into the Central Processing Unit (CPU) hardware for each of: OSS 521-522, MANO orchestrators 523-524, VNFMs 525-526, and VIMs 527-528. Thus, NFV data communication system 500 offers a physically-distributed MANO system that is available to multiple NFVIs on a hardware trusted basis.

HW trust servers 531-532 issue HW trust challenges to OSS 521-522, MANO orchestrators 523-524, VNFMs 525-526, and VIMs 527-528. OSS 521-522, MANO orchestrators 523-524, VNFMs 525-526, and VIMs 527-528 each hash their HW trust challenges with their hardware trust keys to generate and transfer their HW trust results. HW trust servers 531-532 validate the hardware trust results by generating the same HW trust results. If the HW trust validation is positive, then HW trust servers 531-532 transfer a HW trust certificate to the HW trusted MANO sub-system.

NFVIs 501-503 request HW trust certificates from VNFMs 525-526 and VIMs 527-528. In response, VNFMs 525-526 and VIMs 527-528 request HW trust certificates from orchestrators 523-524. In response, orchestrators request HW trust certificates from OSS 521-522. OSS 521-522 returns HW trust certificates to orchestrators 523-524. Orchestrators 523-524 validate and return the valid HW trust certificates to VNFMs 525-526 and VIMs 527-528. VNFMs 525-526 and VIMs 527-528 validate and return the HW trust certificates to NFVIs 501-503.

In NFVIs 501-503, hypervisors or operating systems validate the HW trust certificates from VIMs 525-526 using public keys for certificate authorities in hardware trust servers 531-532. In NFVIs 501-503, VNFs 511-513 also validate the HW trust certificates from VNFMs 525-526 using public keys for the certificate authorities in hardware trust servers 531-532. Once HW trust is established across the distributed MANO system, NFVIs 501-503 may implement NFV MANO control data to drive the delivery of data communications services from trusted hardware. An individual NFVI will not implement NFV MANO control from a MANO system unless all MANO control components (VNFM, VIM, orchestrator, and OSS) are hardware trusted.

Advantageously, the MANO system is both redundant and distributed. The redundancy provides robustness to the MANO system and has been simplified for clarity. The distribution provides efficient MANO access to NFVIs since proximate MANO interfaces could be used when available. The hardware trust allows NFVIs to access robust NFV MANO systems in an efficient and secure manner.

Figure 6:
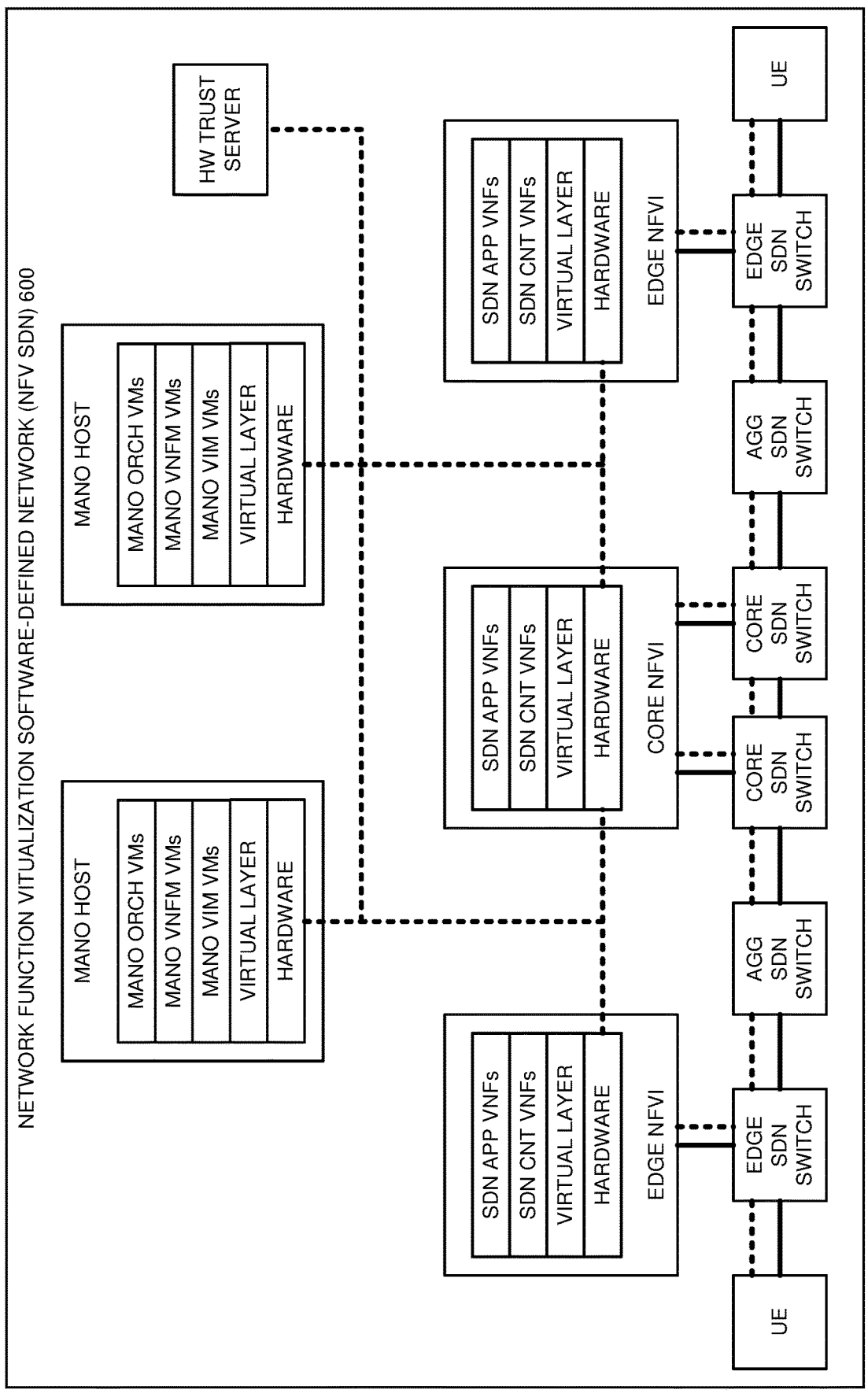
FIG. 6 illustrates an NFV Software Defined Network (SDN) to implement a hardware trusted MANO system.

FIG. 6 illustrates Network Function Virtualization (NFV) Software Defined Network (SDN) 600 to implement a hardware trusted Management and Orchestration (MANO). NFV SDN 600 is an example of NFV data communication system 100, although system 100 may use alternative configurations and operations. NFV SDN 600 comprises: User Equipment (UE), edge SDN switches, aggregation (AGG) SDN switches, core SDN switches, edge NFVIs, a core NFVI, and a MANO NFVI. The NFVIs comprise hardware such as server blades with CPU cores, data memories, I/O transceivers, and the like. The edge SDN switches may include wireless base station VNFs that drive nearby wireless transceivers to exchange wireless data with the UEs.

The NFVIs execute virtual layer software to provide a virtualized processing environment to VNFs and virtual machines. The virtual layer comprises virtual hardware interfaces, hypervisors, operating systems, and NFVI controllers. Under the control of the MANO system, the virtual layers support various SDN VNFs. In the edge and core NFVIs, the virtual layers support SDN controller (CNT) VNFs and SDN application (APP) VNFs. In the MANO hosts, the virtual layer supports Virtual Machines (VMs) for MANO Virtual Infrastructure Managers (VIMs), VNF Managers (VNFMs), and Orchestrators (ORCHs).

Under the direction of the MANO ORCHs, the VIMs and VNFMs transfer networking data to the edge and core virtual layers to drive the execution of the SDN APP and CNT VNFs. To set-up a data session between the UEs, one of the UEs transfers a session request to an SDN application VNF. The SDN application VNF informs other SDN application VNFs to extend the session. The SDN VNFs transfer SDN controller API calls for the UE session to their associated SDN controller VNFs. The SDN controller VNFs transfer SDN data machine API calls to the SDN switches.

API responses flow back from the SDN switches to the SDN controller VNFs and to the SDN application VNFs. If needed, an SDN application VNF may direct an SDN controller VNF to drive an SDN data machine to deliver user data to an NFVI for heavier processing by NFV data-processing VNFs. For example, a given flow may be directed to a VNF to perform packet inspection, encryption, or the like.

Before and during the delivery of these services, the HW trust server issues HW trust challenges to the MANO hosts. The MANO hosts each hash their HW trust challenges with their HW trust keys to generate and transfer HW trust results. The HW trust server validates the HW trust results. If the HW trust validation is positive, then the HW trust server transfers a HW trust certificate to the HW trusted MANO host.

The NFVIs request HW trust certificates from the MANO hosts, and the MANO hosts transfer their HW trust certificates to the requesting NFVIs. In NFVIs 501-503, the virtual layers and VNFs validate the HW trust certificates using keys from a certificate authority in the hardware trust server. If HW trust is established for a MANO host, then an NFVI will implement NFV MANO control data from that MANO host. An NFVI will not implement NFV MANO control data from a hardware-untrusted MANO host.

Figure 7:
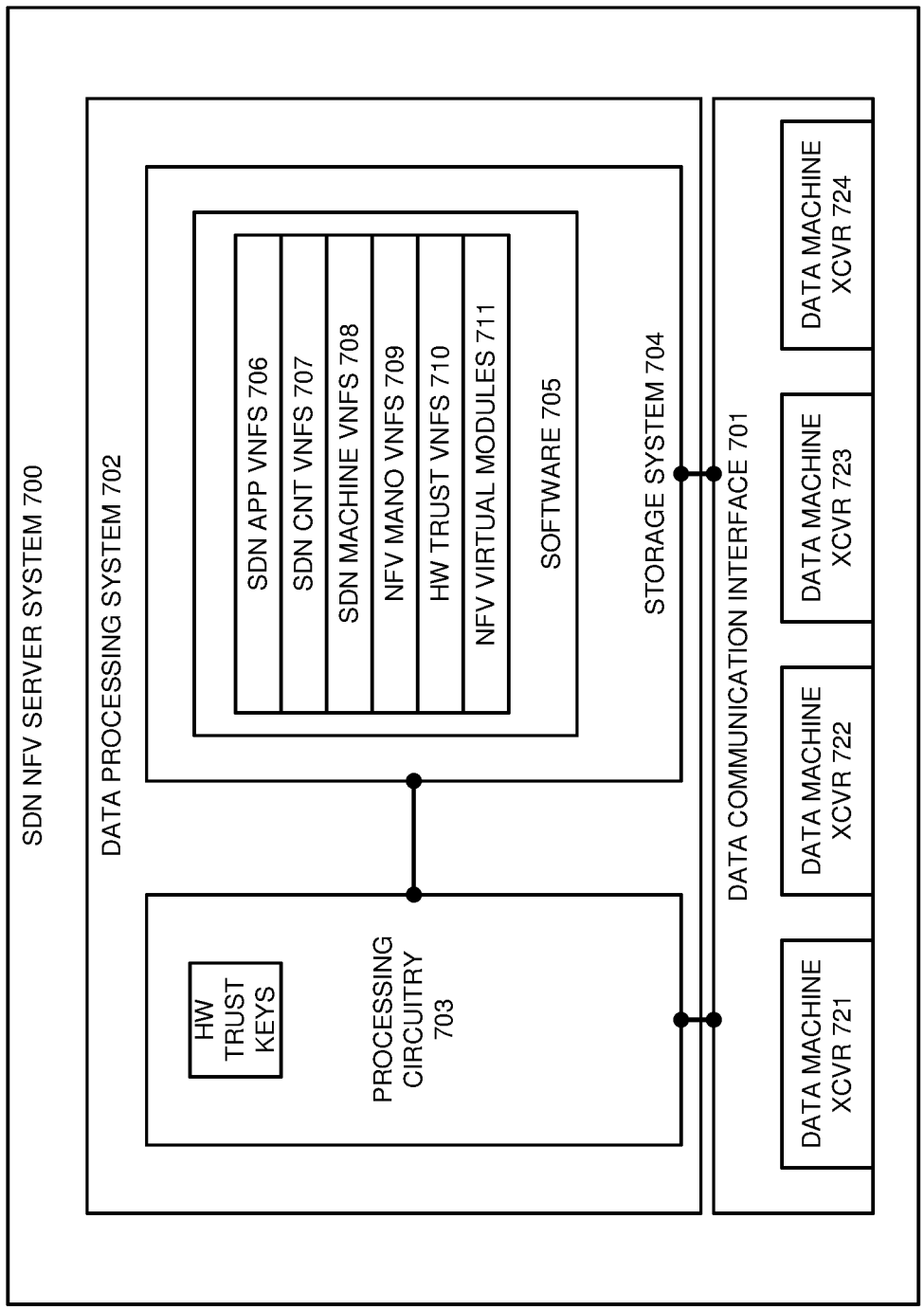
FIG. 7 illustrates an SDN NFV server system to implement hardware trusted MANO system.

FIG. 7 illustrates Software Defined Network (SDN) Network Function Virtualization (NFV) server system 700 to implement hardware trusted Management and Orchestration (MANO). SDN NFV server system 700 is an example of NFV SDN 100, although network 100 may use alternative configurations and operations. SDN NFV server system 700 comprises data communication interface 701 and data processing system 702. Data communication interface 701 comprises data machine transceivers 721-724. Data processing system 702 comprises processing circuitry 703 and storage system 704. Processing circuitry 703 has a physically embedded trust key in each CPU. Storage system 704 stores software 705. Software 705 includes respective software modules 706-711.

Data machine transceivers 721-724 comprise communication components, such as ports, bus interfaces, signal processors, memory, software, and the like. Processing circuitry 703 comprises server blades, circuit boards, bus interfaces, integrated circuitry, and associated electronics. Processing circuitry 703 features CPUs with hardware trust keys that are physically-embedded in internal read-only circuitry. Storage system 704 comprises non-transitory, machine-readable, data storage media, such as flash drives, disc drives, memory circuitry, servers, and the like. Software 705 comprises machine-readable instructions that control the operation of processing circuitry 703 when executed.

SDN NFV server system 700 may be centralized or distributed. All or portions of software 706-711 may be externally stored on one or more storage media, such as circuitry, discs, and the like. Some conventional aspects of SDN NFV server system 700 are omitted for clarity, such as power supplies, enclosures, and the like. When executed by processing circuitry 703, software modules 706-711 direct circuitry 703 to perform the following operations.

SDN application VNFs 706 process user and network data to drive SDN controller VNFs 707 to deliver data communication services to users. SDN controller VNFs 707 process the SDN application API calls to generate SDN data machine API calls that drive external SDN data machines to deliver data communication services to users. SDN machine VNFs 708 comprise virtual SDN data machines that process user traffic for tasks like encryption, transcoding, and the like. NFV MANO VNFs 709 orchestrate and manage SDN VNFs 706-708. HW trust VNFs 710 issue hardware trust challenges, perform hardware trust validations, and issue hardware trust certificates. NFV virtual modules 711 include hypervisors, virtual containers, and NFV control software.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a Network Function Virtualization (NFV) data communication system to implement hardware trusted Management and Orchestration (MANO), the method comprising:
   a Hardware (HW) trust server issuing a first HW trust challenge to a first MANO computer system that controls first NFV Infrastructure (NFVI) circuitry;

the first MANO computer system hashing its physically-embedded read-only hardware trust key to generate a first HW trust result and transferring the first HW trust result to the HW trust server;

the HW trust server validating the first hardware trust result and transferring a first HW trust certificate to the first MANO computer system;

the first MANO computer system transferring the first HW trust certificate and first NFV MANO data to a second MANO computer system; and the second MANO computer system validating the first HW trust certificate, exchanging second NFVI control data with second NFVI circuitry responsive to the first NFV MANO data when the first HW trust certificate is valid, and isolating the first NFV MANO data when the first HW trust certificate is not valid.

2. The method of claim 1 further comprising:

the HW trust server issuing a second HW trust challenge to the second MANO computer system that controls the second NFVI circuitry;

the second MANO computer system hashing its physically-embedded read-only hardware trust key to generate a second HW trust result and transferring the second HW trust result to the HW trust server;

the HW trust server validating the second hardware trust result and transferring a second HW trust certificate to the second MANO computer system;

the second MANO computer system transferring the second HW trust certificate and second NFV MANO data to the first MANO computer system; and the first MANO computer system validating the second HW trust certificate, exchanging first NFVI control data with the first NFVI circuitry responsive to the second NFV MANO data when the second HW trust certificate is valid, and isolating the second NFV MANO data when the second HW trust certificate is not valid.

3. The method of claim 2 further comprising:

the first MANO computer system transferring the first HW trust certificate to the first NFVI circuitry; and the first NFVI circuitry validating the first HW trust certificate, executing first Virtual Network Functions (VNFs) responsive to the first NFVI control data when the first HW trust certificate is valid, and isolating the first NFVI control data when the first HW trust certificate is not valid.

4. The method of claim 3 wherein the first NFVI circuitry executing the first VNFs comprises executing Software Defined Network (SDN) applications and SDN controllers.

5. The method of claim 3 further comprising:

the second MANO computer system transferring the second HW trust certificate to the second NFVI circuitry; and the second NFVI circuitry validating the second HW trust certificate, executing second Virtual Network Functions (VNFs) responsive to the second NFVI control data when the second HW trust certificate is valid, and isolating the second NFVI control data when the second HW trust certificate is not valid.

6. The method of claim 5 wherein the second NFVI circuitry executing the second VNFs comprises executing Software Defined Network (SDN) applications and SDN controllers.

7. The method of claim 5 further comprising:

the HW trust server issuing a third HW trust challenge to the first NFVI circuitry;

the first NFVI circuitry hashing its physically-embedded read-only hardware trust key to generate a third HW trust result and transferring the third HW trust result to the HW trust server;

the HW trust server validating the third hardware trust result and transferring a third HW trust certificate to the first NFVI circuitry;

the first NFVI circuitry transferring the first HW trust certificate to the first MANO computer system; and the first MANO computer system validating the third HW trust certificate, isolating the first NFVI circuitry when the third HW trust certificate is not valid, and wherein transferring the second NFVI control data to the first NFVI circuitry comprises transferring the second NFVI control data to the first NFVI circuitry when the third HW trust certificate is valid.

8. The method of claim 7 further comprising:

the HW trust server issuing a fourth HW trust challenge to the second NFVI circuitry;

the second NFVI circuitry hashing its physically-embedded read-only hardware trust key to generate a fourth HW trust result and transferring the fourth HW trust result to the HW trust server;

the HW trust server validating the fourth hardware trust result and transferring a fourth HW trust certificate to the second NFVI circuitry;

the second NFVI circuitry transferring the fourth HW trust certificate to the second MANO computer system; and the second MANO computer system validating the fourth HW trust certificate, isolating the second NFVI circuitry when the fourth HW trust certificate is not valid, and wherein transferring the first NFVI control data to the second NFVI circuitry comprises transferring the first NFVI control data to the second NFVI circuitry when the fourth HW trust certificate is valid.

9. The method of claim 8 further comprising:

the first NFVI circuitry transferring the third HW trust certificate to the second NFVI circuitry; and the second NFVI circuitry validating the third HW trust certificate, transferring first user data to the first NFVI circuitry when the third HW trust certificate is valid, and isolating the first NFVI circuitry when the third HW trust certificate is not valid.

10. The method of claim 9 further comprising:

the second NFVI circuitry transferring the fourth HW trust certificate to the first NFVI circuitry; and the first NFVI circuitry validating the fourth HW trust certificate, transferring second user data to the second NFVI circuitry when the fourth HW trust certificate is valid, and isolating the second NFVI circuitry when the fourth HW trust certificate is not valid.

11. A Network Function Virtualization (NFV) data communication system to implement hardware trusted Management and Orchestration (MANO), the NFV data communication system comprising:

a Hardware (HW) trust server configured to issue a first HW trust challenge to a first MANO computer system that controls first NFV Infrastructure (NFVI) circuitry;

the first MANO computer system configured to hash its physically-embedded read-only hardware trust key to generate a first HW trust result and transfer the first HW trust result to the HW trust server;

the HW trust server configured to validate the first hardware trust result and transfer a first HW trust certificate to the first MANO computer system;

the first MANO computer system configured to transfer the first HW trust certificate and first NFV MANO data to a second MANO computer system; and the second MANO computer system configured to validate the first HW trust certificate, exchange second NFVI control data with second NFVI circuitry responsive to the first NFV MANO data when the first HW trust certificate is valid, and isolate the first NFV MANO data when the first HW trust certificate is not valid.

12. The NFV data communication system of claim 11 further comprising:

the HW trust server configured to issue a second HW trust challenge to the second MANO computer system that controls the second NFVI circuitry;

the second MANO computer system configured to hash its physically-embedded read-only hardware trust key to generate a second HW trust result and transfer the second HW trust result to the HW trust server;

the HW trust server configured to validate the second hardware trust result and transfer a second HW trust certificate to the second MANO computer system;

the second MANO computer system configured to transfer the second HW trust certificate and second NFV MANO data to the first MANO computer system; and the first MANO computer system configured to validate the second HW trust certificate, exchange first NFVI control data with the first NFVI circuitry responsive to the second NFV MANO data when the second HW trust certificate is valid, and isolate the second NFV MANO data when the second HW trust certificate is not valid.

13. The NFV data communication system of claim 12 further comprising:

the first MANO computer system configured to transfer the first HW trust certificate to the first NFVI circuitry; and the first NFVI circuitry configured to validate the first HW trust certificate, execute first Virtual Network Functions (VNFs) responsive to the first NFVI control data when the first HW trust certificate is valid, and isolate the first NFVI control data when the first HW trust certificate is not valid.

14. The NFV data communication system of claim 13 wherein the first VNFs comprise Software Defined Network (SDN) applications and SDN controllers.

15. The NFV data communication system of claim 13 further comprising:

the second MANO computer system configured to transfer the second HW trust certificate to the second NFVI circuitry; and the second NFVI circuitry configured to validate the second HW trust certificate, execute second Virtual Network Functions (VNFs) responsive to the second NFVI control data when the second HW trust certificate is valid, and isolate the second NFVI control data when the second HW trust certificate is not valid.

16. The NFV data communication system of claim 15 wherein the second VNFs comprise Software Defined Network (SDN) applications and SDN controllers.

17. The NFV data communication system of claim 15 further comprising:

the HW trust server configured to issue a third HW trust challenge to the first NFVI circuitry;

the first NFVI circuitry configured to hash its physically-embedded read-only hardware trust key to generate a third HW trust result and transfer the third HW trust result to the HW trust server;

the HW trust server configured to validate the third hardware trust result and transfer a third HW trust certificate to the first NFVI circuitry;

the first NFVI circuitry configured to transfer the first HW trust certificate to the first MANO computer system; and the first MANO computer system configured to validate the third HW trust certificate, isolate the first NFVI circuitry when the third HW trust certificate is not valid, and transfer the second NFVI control data to the first NFVI circuitry when the third HW trust certificate is valid.

18. The NFV data communication system of claim 17 further comprising:

the HW trust server configured to issue a fourth HW trust challenge to the second NFVI circuitry;

the second NFVI circuitry configured to hash its physically-embedded read-only hardware trust key to generate a fourth HW trust result and transfer the fourth HW trust result to the HW trust server;

the HW trust server configured to validate the fourth hardware trust result and transfer a fourth HW trust certificate to the second NFVI circuitry;

the second NFVI circuitry configured to transfer the fourth HW trust certificate to the second MANO computer system; and the second MANO computer system configured to validate the fourth HW trust certificate, isolate the second NFVI circuitry when the fourth HW trust certificate is not valid, and transfer the first NFVI control data to the second NFVI circuitry when the fourth HW trust certificate is valid.

19. The NFV data communication system of claim 18 further comprising:

the first NFVI circuitry configured to transfer the third HW trust certificate and first user data to the second NFVI circuitry; and the second NFVI circuitry configured to validate the third HW trust certificate, transfer the first user data when the third HW trust certificate is valid, and isolate the first user data when the third HW trust certificate is not valid.

20. The NFV data communication system of claim 19 further comprising:

the second NFVI circuitry configured to transfer the fourth HW trust certificate and second user data to the first NFVI circuitry; and the first NFVI circuitry configured to validate the fourth HW trust certificate, transfer the second user data when the fourth HW trust certificate is valid, and isolate the second user data when the fourth HW trust certificate is not valid.

* * * * *